US007957901B2

(12) United States Patent
Shin et al.

(10) Patent No.: US 7,957,901 B2
(45) Date of Patent: Jun. 7, 2011

(54) SYSTEM FOR GUIDING AN OBSTACLE AVOIDANCE DIRECTION INCLUDING SENSES FOR SUPERSONIC WAVES

(75) Inventors: Byeong Seok Shin, Anyang-si (KR); Ho Nam Ahn, Incheon (KR)

(73) Assignee: Industry Collaboration Foundation of INHA UNIVERSITY, Incheon (KR)

( * ) Notice: Subject to any disclaimer, the term of this patent is extended or adjusted under 35 U.S.C. 154(b) by 831 days.

(21) Appl. No.: 11/964,284

(22) Filed: Dec. 26, 2007

(65) Prior Publication Data
US 2008/0275647 A1 Nov. 6, 2008

(30) Foreign Application Priority Data

May 3, 2007 (KR) .................. 10-2007-0042881

(51) Int. Cl.
*G08G 1/16* (2006.01)
*G01S 3/80* (2006.01)
(52) U.S. Cl. ................. 701/301; 367/118
(58) Field of Classification Search .......... 701/301; 367/99, 100, 118
See application file for complete search history.

(56) References Cited

U.S. PATENT DOCUMENTS

| 5,208,872 | A  | * | 5/1993  | Fisher .............. 382/300 |
| 5,687,136 | A  | * | 11/1997 | Borenstein .......... 367/116 |
| 6,972,796 | B2 | * | 12/2005 | Katta et al. ........ 348/333.01 |
| 7,035,764 | B2 | * | 4/2006  | Rui et al. ............ 702/179 |
| 7,528,703 | B2 | * | 5/2009  | Touge ............... 340/435 |
| 2007/0073484 | A1 | * | 3/2007 | Horibe .............. 701/301 |
| 2010/0121577 | A1 | * | 5/2010 | Zhang et al. ......... 701/301 |

* cited by examiner

*Primary Examiner* — Isam Alsomiri
(74) *Attorney, Agent, or Firm* — Jefferson IP Law, LLP

(57) ABSTRACT

An obstacle avoidance system having an ultrasonic sensor is provided. The system includes an ultrasonic sensor array having at least one ultrasonic sensor for measuring a distance to an obstacle using an ultrasonic wave, an orientation tracker for tracking a proceeding direction, a controller for receiving distance data and orientation data from the ultrasonic sensor array and the orientation tracker, respectively, and for determining an avoidance orientation based on the distance data and the orientation data, and an avoidance orientation guiding unit for informing the pedestrian of the avoidance orientation determined by the controller. The controller stores distance data for a certain number of previous frames and, if the controller determines that distance data of a first frame is noise, the distance data of the first frame is replaced with an average between the distance data of a frame prior to the first frame and the distance data of a frame after the first frame. Also, the controller calculates an amount of orientation change for a second frame using the orientation data of the orientation tracker and regards the distance data of the second frame as noise, if the calculated amount of orientation change is greater than a threshold.

4 Claims, 6 Drawing Sheets

SYSTEM FOR GUIDING AN OBSTACLE AVOIDANCE DIRECTION INCLUDING SENSES FOR SUPERSONIC WAVES

PRIORITY

This application claims the benefit under 35 U.S.C. §119 (a) of a Korean patent application filed on May 3, 2007 in the Korean Intellectual Property Office and assigned Serial No. 10-2007-0042881, and the entire disclosure of which is hereby incorporated by reference.

BACKGROUND OF THE INVENTION

1. Field of the Invention

The present invention relates to an obstacle avoidance system with an ultrasonic sensor. More particularly, the present invention relates to an obstacle avoidance system with an ultrasonic sensor which replaces distance data of a frame determined as noise with an average from distance data of frames prior to and after the noise frame, calculates an amount of orientation change of another frame using an orientation tracker, and regards distance data of another frame as noise if the calculated amount of orientation change is greater than a threshold, thereby resolving the problems caused by the ultrasonic sensor.

2. Description of the Related Art

In general, blind or visually impaired people walk on streets using a white cane or a guide dog. When using a white cane, the blind or visually impaired pedestrian can sense only a small area and is forced to slow his or her pace. On the other hand, while a guide dog may allow the blind or visually impaired pedestrian to walk safely, he or she must pay a training fee for the guide dog. Also blind or visually impaired people cannot enter many places due to animals not being allowed. In order to resolve these problems, various obstacle avoidance systems and methods have been developed.

For example, there are an electronic travel aid (ETA) and a robotic travel aid (RTA) that assist blind or visually impaired people in traveling.

The RTA is an apparatus configured in such a way that a robot senses obstacles and guides the blind or visually impaired person. The RTA is advantageous in that it can employ a high performance computer because it depends on the performance and mobility of the robot but is not restricted by its weight. However, the RTA has a drawback in that it can only move horizontally. So, compared to the ETA, the mobility of the RTA is relatively restricted.

The ETA is an apparatus that uses an electronic controller to assist a blind or visually impaired pedestrian in traveling. Such an ETA is implemented by a wearable computing device. The device is operated in such a way that a CCD camera shoots the front image and a travelable path is calculated using an image processing method. However, the image processing method is disadvantageous in that it requires a large amount of calculation to obtain the desired information and thus takes a long time. The wearable computing device may be implemented to include an ultrasonic sensor that senses obstacles. The ultrasonic sensor is relatively lower in price and less harmful than a laser range scanner, but has drawbacks in that it causes serious noise due to signal scattering or signals attenuation. In particular, these conventional obstacle avoidance methods, which use an ultrasonic sensor, have disadvantages in that, since they do not consider vibration from a pedestrian's travel, the avoidance orientation frequently changes.

SUMMARY OF THE INVENTION

Therefore, an aspect of the present invention is to address at least the above-mentioned problems and to provide at least the advantages described below. Accordingly, an aspect of the present invention is to provide an obstacle avoidance system with an ultrasonic sensor, which replaces distance data of a frame determined as noise with an average from distance data of frames prior to and after the noise frame to remove the noise caused by the ultrasonic sensor, and calculates an amount of orientation change of another frame using an orientation tracker to regard the distance data of another frame as noise, if the calculated amount of orientation change is greater than a threshold, to thus resolve a problem caused by the pedestrian's vibration.

Although the present invention is implemented to improve an obstacle avoidance system for the blind or visually impaired, it should be understood that the idea of the present invention may be applied to all the obstacle avoidance systems that are configured to include an ultrasonic sensor.

In accordance with an aspect of the present invention, an obstacle avoidance system is provided. The obstacle avoidance system includes an ultrasonic sensor array having at least one ultrasonic sensor for measuring a distance to an obstacle using an ultrasonic wave, an orientation tracker for tracking a proceeding direction, a controller for receiving distance data and orientation data from the ultrasonic sensor array and the orientation tracker, respectively, and for determining an avoidance orientation based on the distance data and the orientation data, and an avoidance orientation guiding unit for informing the avoidance orientation determined by the controller. Here, the controller stores distance data for a certain number of previous frames and, if determining that the distance data of a first frame is noise, replaces the distance data of the first frame with an average between the distance data of a frame prior to the first frame and the distance data of a frame after the first frame. In addition, the controller calculates an amount of orientation change for a second frame using the orientation data of the orientation tracker and regards the distance data of the second frame as noise, if the calculated amount of orientation change is greater than a threshold.

In accordance with an aspect of the present invention, the controller determines that the distance data of the first frame is noise if the absolute value of the slope of the distance data of the first frame is equal to or greater than a certain reference value.

In accordance with an aspect of the present invention, the avoidance orientation guiding unit informs the avoidance orientation through a voice signal or vibration.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and other advantages of certain exemplary embodiments of the present invention will be more clearly understood from the following detailed description taken in conjunction with the accompanying drawings, in which:

FIGS. 6A, 6B and 6C are views to describe the performance of the embodied obstacle avoidance system of FIG. 5, in which FIGS. 6A and 6B are places where the performance test is conducted and FIG. 6C is a path where a user wearing the embodied obstacle avoidance system has walked.

Throughout the drawings, like reference numerals will be understood to refer to like parts, components and structures.

BRIEF DESCRIPTION OF SYMBOLS IN THE DRAWINGS

Figure 1:
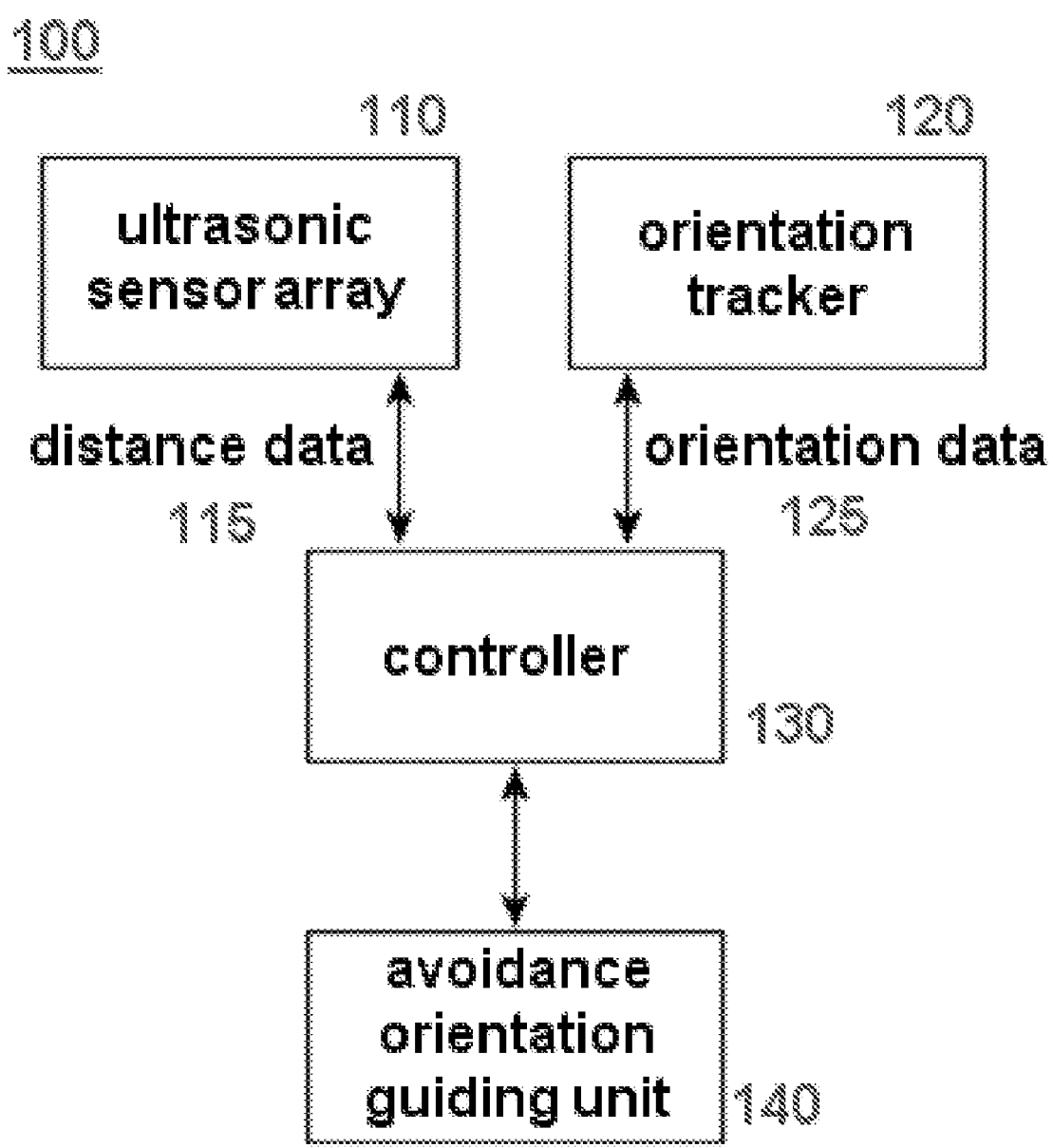
FIG. 1 is a schematic block diagram illustrating an obstacle avoidance system including an ultrasonic sensor according to an exemplary embodiment of the present invention.

100: obstacle avoidance system
110: ultrasonic sensor array
115: distance data
120: orientation tracker
125: orientation data
130: controller
140: avoidance orientation guiding unit
500: embodied obstacle avoidance system
510: ultrasonic sensor array
520: controller
530: voice guidance unit
540: vibration jacket
545: vibration unit
550: power supply

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

FIG. 1 is a schematic block diagram illustrating an obstacle avoidance system including ultrasonic sensors according to an exemplary embodiment of the present invention.

The obstacle avoidance system 100 includes an ultrasonic sensor array 110 for measuring a distance to an obstacle using an ultrasonic wave, an orientation tracker 120 for tracking a proceeding direction, a controller 130 for receiving distance data 115 from the ultrasonic sensor array 110 and orientation data 125 from the orientation tracker 120 and determining an avoidance orientation based on the distance data 115 and the orientation data 125, and an avoidance orientation guiding unit 140 for informing the avoidance orientation determined by the controller 130.

The ultrasonic sensor array 110 serves to measure a distance to an obstacle using an ultrasonic wave, and is configured to include at least one or more ultrasonic sensor. The ultrasonic sensors assist the controller to calculate the distance from itself to the obstacle time-of-fly (TOF) measurement, and to determine that an obstacle exists on the current movement path if the distance data value is gradually decreasing during the movement, so that the system can avoid the obstacle. The ultrasonic sensors may be arrayed in many ways, which will be described as follows.

Figure 2:
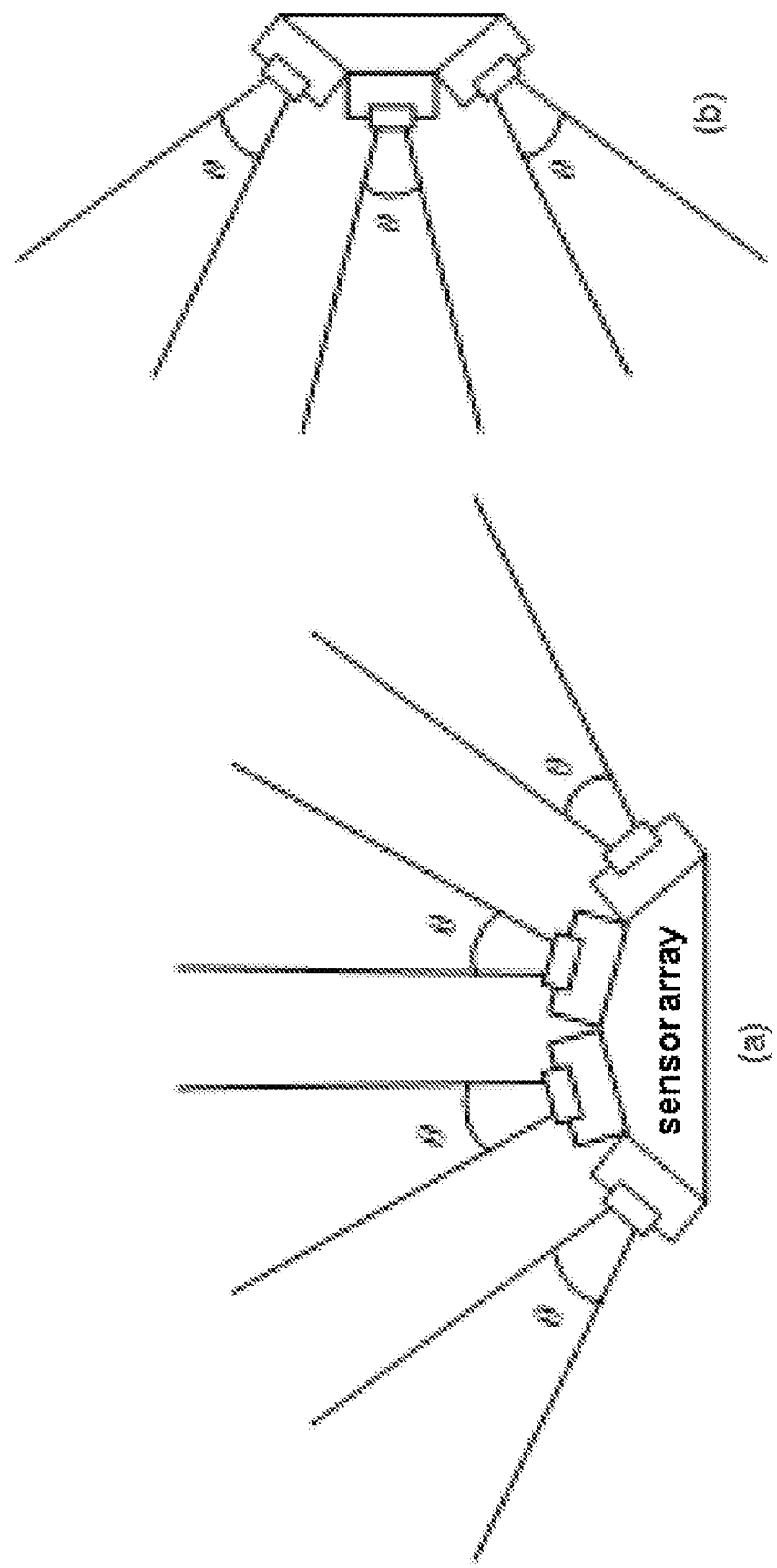
FIGS. 2A and 2B are views to describe a method for arraying ultrasonic sensors according to an exemplary embodiment of the present invention.

FIGS. 2A and 2B are views to describe the method for arranging ultrasonic sensors according to an exemplary embodiment of the present invention, in which FIG. 2A is a horizontal cross-sectional view of the ultrasonic sensor array and FIG. 2B is a vertical cross-sectional view of the ultrasonic sensor array.

In an exemplary embodiment of the present invention, the ultrasonic sensors are arrayed in a hemisphere so that their sensing ranges cannot overlap each other. In particular, as shown in FIG. 2B, the ultrasonic sensor array according to an exemplary embodiment of the present invention may be implemented with three rows of ultrasonic sensors, i.e., an upper row, middle row and lower row. The ultrasonic sensors in the upper row serve to sense an obstacle conflicting with the pedestrian's head, the ultrasonic sensors in the middle row serve to calculate an avoidance orientation, and the ultrasonic sensors in the lower row serve to sense an obstacle on the ground. Therefore, the ultrasonic sensor array 110 can sense a wide range of area and rapidly obtain the distance data 115. The distance data 115 can be transmitted to the controller 130, or a wearable computer, through a USB port.

The orientation tracker 120 serves to track the proceeding orientation and to thus resolve problems in the conventional obstacle avoidance system with an ultrasonic sensor for the blind or visually impaired pedestrian. As described above, the conventional problem is that the conventional obstacle avoidance system frequently changes the avoidance orientation because it does not consider the vibration caused by the movement of the blind or visually impaired pedestrian.

Figure 3:
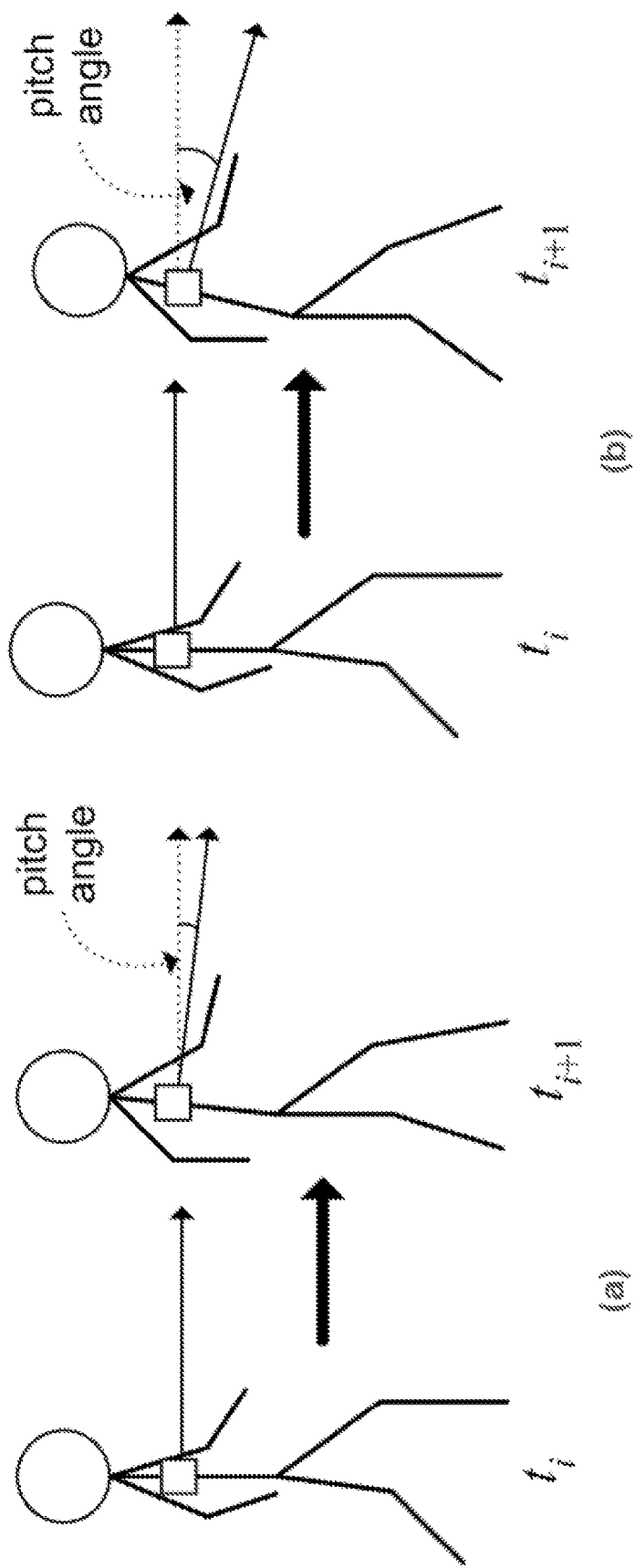
FIGS. 3A and 3B are views to describe whether an orientation tracker should consider a vibration caused by a pedestrian's movement based on an amount of orientation change from the vibration.

FIGS. 3A and 3B are views to describe whether an orientation tracker should consider a vibration caused by a pedestrian's movement based on an amount of orientation change from the vibration, in which FIG. 3A is a view illustrating a case where the amount of orientation change is so small that the controller can ignore the vibration, and FIG. 3B is a view illustrating a case where the amount of orientation change is greater than a threshold so that the controller can consider the vibration.

As shown in FIGS. 3A and 3B, the orientation tracker 120 calculates how much orientation in each frame is changed. That is, the amount of orientation change can be checked through a pitch angle obtained by comparing a current frame with a previous frame. The calculated amount of orientation change is compared with a threshold in the controller 130. If the amount of orientation change is relatively small, or less than the threshold, as shown in FIG. 3A, the controller 130 ignores the vibration caused by the pedestrian's movement. However, if the amount of orientation change is relatively large or greater than the threshold, as shown in FIG. 3B, the controller 130 considers the vibration and regards the distance data of a corresponding frame as noise.

The controller 130 receives distance data 115 and orientation data 125 from the ultrasonic sensor array 110 and the orientation tracker 120 connected thereto, respectively, and determines an avoidance orientation based on the received data 115 and 125. The controller 130 controls the avoidance orientation guiding unit 140 connected thereto to inform the determined avoidance orientation. In particular, the controller 130 may be configured to resolve the noise problem caused by the characteristics of the ultrasonic sensor.

Figure 4:
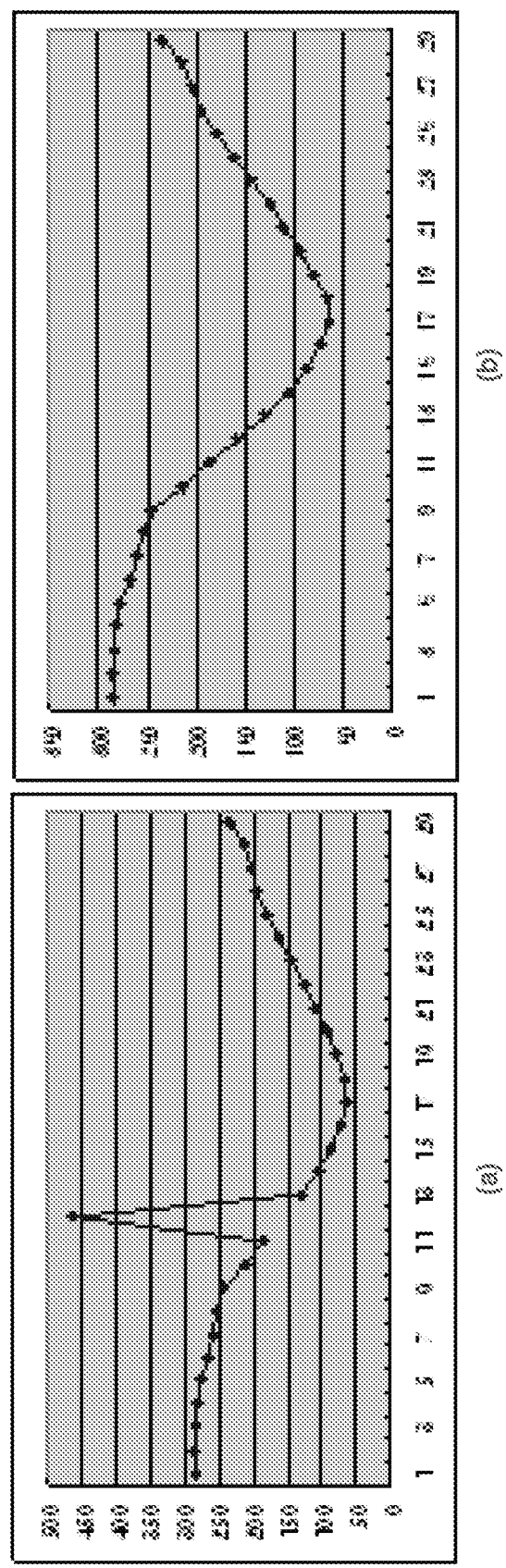
FIGS. 4A and 4B are graphs to describe a method that processes noise of an ultrasonic sensor according to an exemplary embodiment of the present invention.

FIGS. 4A and 4B are graphs that describe a method of processing noise of an ultrasonic sensor according to an exemplary embodiment of the present invention, in which FIG. 4A is a graph illustrating distance data including noise and FIG. 4B is a graph illustrating distance data after removing noise.

As described above, the ultrasonic sensor causes serious noise due to signal scattering or signal attenuation. In order to resolve the problem, an exemplary embodiment of the present invention proposes to replace the distance data of a frame determined as noise with an average value between distance data of frames prior to and after the noise frame. The graph of FIG. 4B has been obtained as noise shown in the graph of FIG. 4A is removed from the system by the method of the exemplary embodiment of the present invention. Here, noise generation can be determined by the characteristic that distance data is rapidly increased or decreased if noise occurs. In an exemplary embodiment of the present invention, the controller 130 determines whether an absolute value of a slope of distance data of a certain frame is greater than a reference value and, accordingly, determines whether the distance data of the frame is noise.

The avoidance orientation guiding unit 140 serves to inform the avoidance orientation determined by the controller 130. The avoidance orientation guiding unit 140 may be implemented by a voice output means for outputting voice signals and a vibration jacket for conducting vibrations to inform the pedestrian of an avoidance orientation. The avoidance orientation may be classified into four types, "Standing left," "Left," "Right," and "Standing right," each of which is given to the pedestrian by a voice signal and a vibration pattern. The vibration jacket allows the blind or visually impaired pedestrian to intuitively and rapidly recognize the avoidance orientation, compared to the voice signal. Meanwhile, the voice output means can output additional voice signals, such as "Start," and "Stop," which are difficult to be expressed through vibration patterns, as well as the above-described voice signals.

Figure 5:
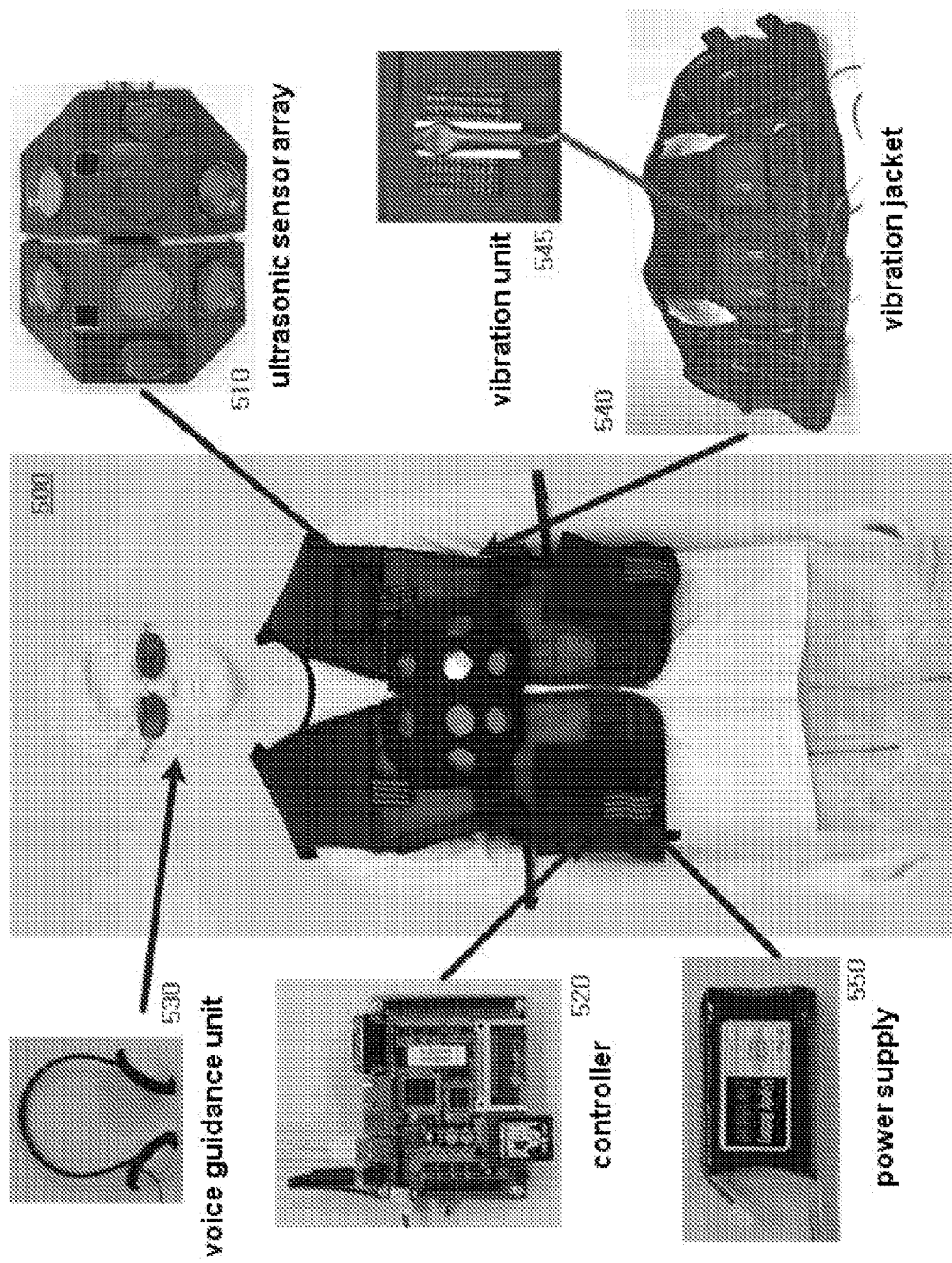
FIG. 5 is a view illustrating an obstacle avoidance system according to an exemplary embodiment of the present invention.

FIG. 5 is a view illustrating an obstacle avoidance system according to an exemplary embodiment of the present invention.

As shown in FIG. 5, the embodied obstacle avoidance system 500 includes an ultrasonic sensor array 510, a controller 520, a voice guidance unit 530, a vibration jacket 540 and a power supply 550.

Considering the manufacturing cost, the ultrasonic sensor array 510 is implanted to include eight ultrasonic sensors. It should be understood that the ultrasonic sensor array 510 is not restricted by the number of ultrasonic sensors. Furthermore, it should be noted that increasing the number of ultrasonic sensors improves the precision of the system but manufacturing costs are also increased. The controller 520 is implemented with an ARM9 based embedded system. The power supply 550 is implemented by a Li-ion battery. The vibration jacket 540 is configured to include eight vibrators 545. Although an orientation tracker is not shown in FIG. 5, it may be included in the ultrasonic sensor array 510 or the controller 520.

In order to test the performance of the embodied obstacle avoidance system 500, a blind pedestrian wearing the system 500 travels a corridor where an obstacle is placed.

Figure 6:
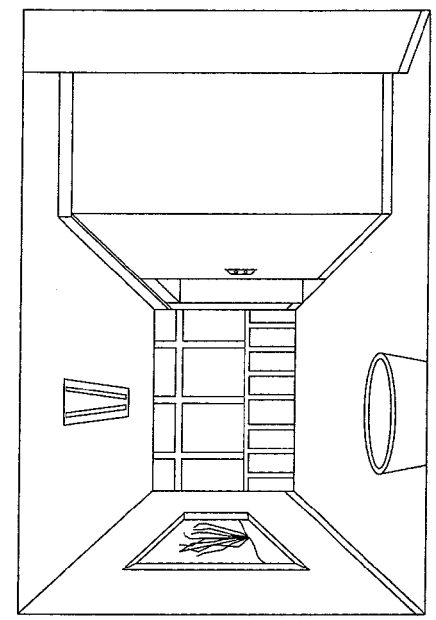
Figure 6:
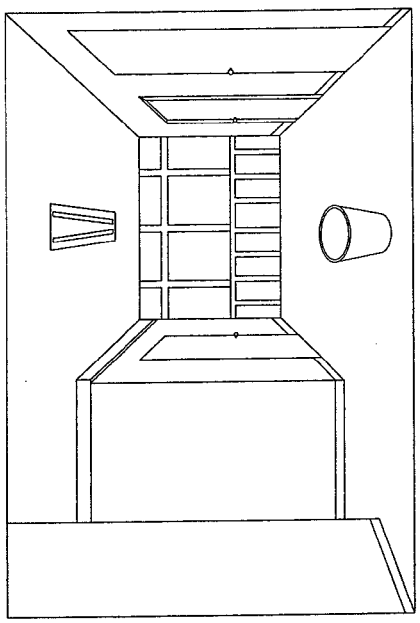
Figure 6:
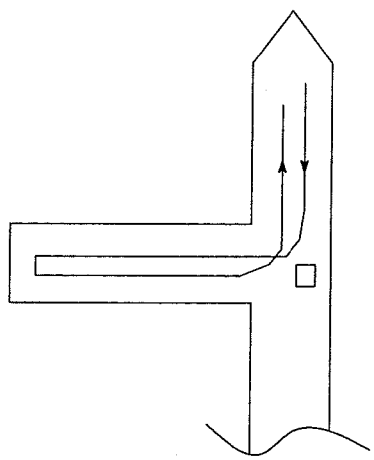

FIGS. 6A, 6B and 6C are views that describe the performance of the embodied obstacle avoidance system of FIG. 5, in which FIGS. 6A and 6B are places where the performance test is conducted and FIG. 6C is a path where a user wearing the embodied obstacle avoidance system has walked. In FIG. 6C, grey denotes a region sensed by the ultrasonic sensor array and a red line denotes a path traveled by the blind pedestrian.

As shown in FIGS. 6A to 6C, the blind pedestrian wearing the embodied obstacle avoidance system can travel the corridor without colliding with the obstacle. In particular, the system allows the pedestrian to walk at approximately 1 km/hr, which indicates that it can be used in real life.

As described above, the obstacle avoidance system with an ultrasonic sensor according to an exemplary embodiment of the present invention can replace the distance data of a frame determined as noise with an average value from the distance data of frames prior to and after the noise frame in order to remove the noise caused by the ultrasonic sensor, and can calculate the amount of orientation change of another frame using an orientation tracker to regard the distance data of another frame as noise if the calculated amount of orientation change is greater than a threshold, to thus resolve a problem caused by the pedestrian's vibration.

Also, although the present invention is implemented to improve an obstacle avoidance system for the blind or visually impaired people, it should be understood that the present invention may be applied to all the obstacle avoidance systems that are configured to include an ultrasonic sensor.

While the present invention has been described with reference to certain exemplary embodiments thereof, those skilled in the art will appreciate that various modifications, additions and substitutions are possible, without departing from the scope and spirit of the invention as defined by the appended claims and their equivalents.

What is claimed is:

1. An obstacle avoidance system comprising:
    an ultrasonic sensor array having at least one ultrasonic sensor, for measuring a distance to an obstacle using an ultrasonic wave;
    an orientation tracker for tracking a proceeding direction;
    a controller for receiving distance data and orientation data from the ultrasonic sensor array and the orientation tracker, respectively, and determining an avoidance orientation based on the distance data and the orientation data; and
    an avoidance orientation guiding unit for informing the avoidance orientation determined by the controller,
    wherein the controller stores distance data for a certain number of previous frames and, if determining that the distance data of a first frame is noise, replaces the distance data of the first frame with an average between the distance data of a frame prior to the first frame and the distance data of a frame after the first frame,
    wherein the controller calculates an amount of orientation change for a second frame using the orientation data of the orientation tracker and regards the distance data of the second frame as noise, if the calculated amount of orientation change is greater than a threshold.

2. The system according to claim 1, wherein the controller determines that the distance data of the first frame is noise if the absolute value of the slope of the distance data of the first frame is equal to or greater than a certain reference value.

3. The system according to claim 2, wherein the avoidance orientation guiding unit informs the avoidance orientation through a voice signal or vibration.

4. The system according to claim 1, wherein the avoidance orientation guiding unit informs the avoidance orientation through a voice signal or vibration.

* * * * *